United States Patent
Ho et al.

(10) Patent No.: US 7,668,243 B2
(45) Date of Patent: Feb. 23, 2010

(54) AUDIO AND VIDEO CLOCK SYNCHRONIZATION IN A WIRELESS NETWORK

(75) Inventors: Jin-Meng Ho, Plano, TX (US); Richard T. Baker, Walburg, TX (US); Allison Winifred Hicks, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1191 days.

(21) Appl. No.: 10/847,804

(22) Filed: May 18, 2004

(65) Prior Publication Data

US 2005/0259754 A1 Nov. 24, 2005

(51) Int. Cl.
*H04N 7/12* (2006.01)
*H04W 4/00* (2009.01)

(52) U.S. Cl. .................. 375/240.28; 370/329

(58) Field of Classification Search ............ 375/240.26, 375/240.28; 370/329, 345; 700/19; 709/248
See application file for complete search history.

(56) References Cited

U.S. PATENT DOCUMENTS

| | | | |
|---|---|---|---|
| 6,868,125 B2 * | 3/2005 | Gendel | 375/240.26 |
| 7,269,151 B2 * | 9/2007 | Diener et al. | 370/329 |
| 2004/0208158 A1 * | 10/2004 | Fellman et al. | 370/345 |
| 2005/0182856 A1 * | 8/2005 | McKnett | 709/248 |
| 2007/0100473 A1 * | 5/2007 | Shvodian et al. | 700/19 |

OTHER PUBLICATIONS

Shvodian, W.M., et al., "Synchronization of Isochronous Streams Over a Wireless Communication Link," U.S. Appl. No. 60/483,629, filed Jul. 1, 2003, 22 pages.

* cited by examiner

*Primary Examiner*—Gims S. Philippe
(74) *Attorney, Agent, or Firm*—Steven A. Shaw; W. James Brady; Frederick J. Telecky, Jr.

(57) ABSTRACT

System and method for synchronizing clocks and maintaining packet timing relationships in a wireless communications system. A preferred embodiment further comprises periodically synchronizing local clocks at a transmitter and a receiver to a clock reference, adding a timestamp to each application packet at a transmitter of a wireless network, setting the timestamp to a value of a local time at the transmitter plus a link delay, buffering a received packet at a receiver, and releasing the buffered packet to an application level when a value of a local time at the receiver equals the timestamp value in the packet. This can help to ensure that the timing relationships between data packets present at a transmitter is maintained at a receiver, regardless of transport delays (waiting, transmission and processing) incurred by the data packets.

39 Claims, 6 Drawing Sheets

AUDIO AND VIDEO CLOCK SYNCHRONIZATION IN A WIRELESS NETWORK

TECHNICAL FIELD

The present invention relates generally to a system and method for wireless communications and more particularly to a method for synchronizing audio and video clocks in a wireless communications system and preserving packet timing relationships of the streams traversing from a transmitter to a receiver(s).

BACKGROUND

The current developmental trend for wireless networks is increasing the data rate. As the data rates increase, the number and types of applications that can use the wireless networks also increases. For example, in the early wireless networks, applications were typically limited to file transfers and other computer data related operations because of bandwidth limitations and latency issues. Time critical applications, such as streaming audio and video, usually require more bandwidth than files and computer data (along with less latency and jitter) and normally could not be serviced by these early wireless networks. Still, the convenience of being wireless made these early wireless networks a viable product despite the limited functionality. Now, due to the introduction of new wireless networks with significant data rates, wireless networks usage models are being expanded to include applications such as multimedia distribution (video and/or audio), video conferencing, and so forth, which require much higher data rates than previous applications.

Since applications such as multimedia distribution, video conferencing, and so forth, are interactive in nature, the performance of the network used in carrying the information is crucial. The key issues for audio and video streaming over a wireless network are latency and jitter. Latency and jitter can affect the timing of when the audio and/or video frames are received at a decoder and presented to the user. Due to the nature of video and audio codecs, a receiving decoder must receive the audio and/or video stream with the same packet timing relationships as was present at an originating source. If the original packet timing relationships of streams from the source (also referred to as a source device) are not preserved at the receiver (also referred to as a sink device), then the receiver's decoder buffer may overflow or underrun. This can cause audible and visible glitches and provide a poor user experience. These problems were not significant issues when wireless networks were used solely for data, which can be far less delay and jitter sensitive, but are issues that must be addressed for streaming audio and video applications.

A technique that can be used to help ensure that frames arrive in a timely manner is to impose quality of service (QoS) constraints on at least a portion of the communications system. By implementing QoS, frames that are timing crucial can be given priority over those that are not. This can ensure that the higher priority frames will arrive at their destination with minimum latency.

A technique that can be used to preserve packet timing relationships between the source device (transmitter) and the sink device (receiver), and thereby minimize the effects of latency and jitter over the wireless network, is to place time stamps on the transmitted frames. When a frame is received at the receiver, the receiver can retrieve the time stamp from the frame and release the frame to the application once the local clock reading reaches the value in the time stamp.

One disadvantage of the prior art is that while the implementation of QoS constraints can help to ensure timely delivery of transmitted frames, the QoS constraints typically do not contain mechanisms for ensuring that the inter-arrival patterns between packets are retained across the wireless network.

A second disadvantage of the prior art is that while time stamping is used in controlling the release of received frames, there is usually a clock rate mismatch between the transmitter and the receiver. Hence, problems such as buffer overflow and underrun can still occur since the clocks of the transmitter and receiver can continue to drift further and further apart.

SUMMARY OF THE INVENTION

These and other problems are generally solved or circumvented, and technical advantages are generally achieved, by preferred embodiments of the present invention which provides a system and method for synchronizing clocks of transmitters and receivers and preserving packet timing relationships of the streams traversing from a transmitter to a receiver(s).

In accordance with a preferred embodiment of the present invention, a method for preserving packet timing relationships at a source and a destination includes synchronizing local clocks at the source and the destination to a reference clock at periodic intervals. At the source, timestamps are appended to each packet out of a plurality of packets and then each packet is transmitted to the destination. At the destination, the timestamp in each packet is adjusted. When the local clock of the destination is equal to the adjusted timestamp of each packet, the packet can be released to an application level. Other embodiments of the invention provide other features.

In accordance with another preferred embodiment of the present invention, a method for correcting a clock in a wireless method includes receiving a frame, wherein the frame is one of a periodic sequence of frames. A start time can be calculated for the frame and then the start time can be adjusted. A clock error value may then be computed and used to correct a local clock value. Other embodiments of the invention provide other features.

In accordance with yet another preferred embodiment of the present invention, a circuit includes an adder that can be used to combine an update delay with a beacon start time. Coupled to the adder is a subtractor that can be used to subtract a local time from an output provided by the adder. A voltage controlled oscillator, coupled to the subtractor, can be used to generate a signal at a certain frequency that is dependant upon an output of the subtractor. Also, a local timer, coupled to the voltage controlled oscillator, can be used to keep track of elapsed time based upon a frequency of the signal generated by the voltage controlled oscillator. Other embodiments of the invention provide other features.

An advantage of a preferred embodiment of the present invention is that the communications system itself does not need to be modified to support the synchronization of the clocks of the transmitter and the receiver and the preservation of the timing relationships of packets transported from the transmitter to the receiver. Therefore, the introduction of a preferred embodiment of the present invention can be performed in a continuous process, in the form of newly enhanced devices or software, rather than needing to replace existing communications systems. This can offer a measure of compatibility with older devices that do not have the clock synchronization built-in and does not make them immediately obsolete.

A further advantage of a preferred embodiment of the present invention is that the clock synchronization can be periodically performed to enable continual synchronization of the clocks. By continually synchronizing clocks, any clock rate mismatches due to fundamental crystal or design differences are corrected without changes to the clock and oscillator.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF Illustrative Embodiments

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
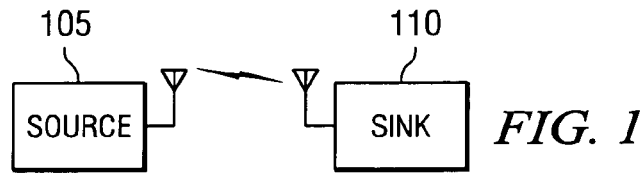
FIG. 1 is a diagram of two wireless devices, a source device and a sink device.

The present invention will be described with respect to preferred embodiments in a specific context, namely ultra-wideband (UWB) and IEEE 802.11 technical standard compliant wireless personal and local area networks that can be used to transport timing sensitive data, such as audio and/or video streams. UWB wireless personal area networks, in the United States, are compliant to a First Report and Order issued by the Federal Communications Commission entitled "FCC 02-48: Revision of Part 15 of the Commission's Rules Regarding Ultra-Wideband Transmission Systems," published April 2002. The IEEE 802.11 technical standards comprise an initial standard, IEEE 802.11, which was specified in a document entitled "ISO/IEC 8802-11, ANSI/IEEE Std 802.11, First Edition 1999-00-00, Information Technology— Telecommunications and Information Exchange Between Systems—Local and Metropolitan Area Networks—Specific Requirements—Part 11: Wireless LAN Medium Access Control (MAC) and Physical Layer (PHY) Specification," published 1999. The IEEE 802.11 technical standard was then followed by a series of supplemental technical standards, including IEEE 802.11b (entitled "IEEE Std 802.11b-1999, Supplement to ANSI/IEEE Std 802.11, 1999 Edition, Supplement to IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications— Higher-Speed Physical Layer Extension in the 2.4 GHz Band," published September 1999), IEEE 802.11a (entitled "IEEE Std 802.11a-1999, Supplement to ANSI/IEEE Std 802.11, 1999 Edition, Supplement to IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Higher-Speed Physical Layer in the 5 GHz Band," published September 1999), and IEEE 802.11g (entitled "IEEE Std 802.11g-2003, Amendment to IEEE Std 802.11, 1999 Edition, as amended by IEEE Stds 802.1 a-1999, 802.11b-1999, 802.11b-1999/cor 1-2001, and 802.11d-2001, EEE Standard for Information Technology— Telecommunications and Information Exchange Between Systems—Local and Metropolitan Area Networks—Specific Requirements—Part 11: Wireless LAN Medium Access Control (MAC) and Physical Layer (PHY) Specifications— Amendment 4: Further Higher Data Rate Extensions in the 2.4 GHz Band," published 2003). The invention may also be applied, however, to other wireless communications systems, such as frequency hopping networks, HiperLAN, HiperLAN II, GSM, BlueTooth, and so forth wherein synchronizing clocks between transmitter and receiver can be difficult with built-in features of the communications system With reference now to FIG. 1, there is shown a diagram illustrating two wireless devices, a source device 105 and a sink device 110. The source device 105 may be used to provide content, such as audio, video, multimedia (audio and video), and so forth, to the sink device 110. For example, the source device 105 may be connected to a DVD player (not shown) in a user's home and can be used to transmit video and audio content from the DVD player to a television set (not shown) connected to the sink device 110. The source device 105 and the sink device 110 may be connected via a wireless communications system, such as one employing an Ultra-Wideband communications technique, an IEEE 802.11 technical standard, or some other wireless communications standard (such as those listed above).

High data rate applications, such as video, audio, and multimedia, employing standards such as MPEG-1, MPEG-2, MPEG-4, MP3, and others, from sources such as DVD players, digital video cassette players, digital video camcorders, set top boxes, and so forth, may often have relatively strict timing requirements. For example, not only does transmitted audio and video frame data need to arrive at the destination in the order it was transmitted, but it also needs to arrive with a fairly constant end-to-end delay relative to neighboring frames. A minimal variance in delay time is required to present the audio and video in an acceptable form to the decoder, and ultimately a human user.

Figure 2:
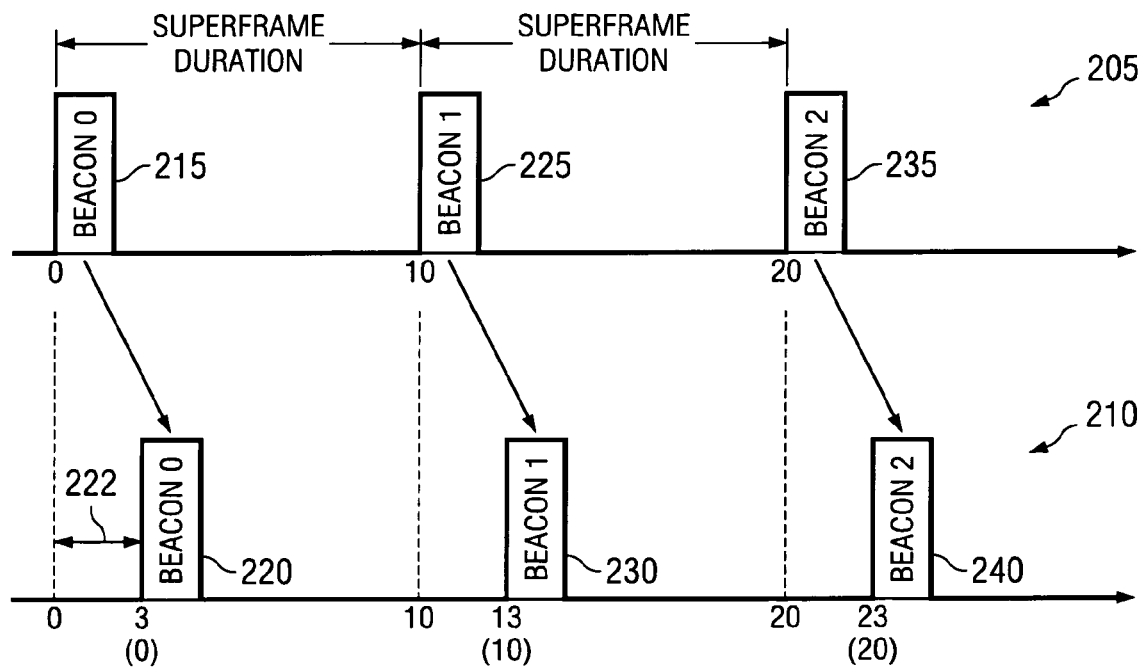
FIG. 2 is a diagram of transmission and processing delays incurred by beacons.

With reference now to FIG. 2, there is shown a timing diagram illustrating a first sequence of beacons 205 as transmitted by a piconet coordinator (or an access point), and how the propagation and processing delay can affect timing. The first sequence of beacons 205 may contain a series of beacons, such as beacons 215, 225, and 235, which can be transmitted by the piconet coordinator/access point. Each beacon can be assigned a unique identifier, such as a beacon number. For example, beacon 215 may be identified as 'beacon number 0' and beacon 225 may be identified as 'beacon number 1.' For discussion purposes, let there be a 10 time unit separation between the transmission of each beacon. Therefore, beacon 215 can be transmitted at time unit zero (0), beacon 225 can be transmitted at time unit ten (10), and beacon 235 can be transmitted at time unit 20.

A second sequence of beacons 210 can represent the beacons from the first sequence of beacons 205 after they have been received by a device and have undergone processing. A beacon 220 can correspond to the beacon 215 while a beacon 230 can correspond to the beacon 225 and beacon 240 can correspond to beacon 235 and so on. An amount of time incurred by a beacon due to propagation and processing can be displayed as an interval 222 and may be referred to as the update delay. Note that in most instances, the delay due to propagation may be very small and can be negligible. Therefore, the dominant factor in the interval 222 can be the processing delay.

Note that due to the processing delay, the exact times associated with the beacons may be different at the piconet coordinator or access point and at the device. For instance, the beacon 215 was transmitted by the piconet coordinator/access point at time zero (0); however, at the device, the beacon 220 does not arrive at the sink until time three (3). This inconsistency in time can lead to synchronization difficulties and should be corrected.

Typically beacons are transmitted to precede normal data transmissions, with each beacon marking the beginning of a superframe. The beacons can be uniquely identified by a beacon number or a time stamp. From the beacon number or time stamp, it can be possible to calculate a timing reference associated with the beacon transmit start time. For example, the beacon 215 can be uniquely identified by its beacon number, zero (0). From this beacon number, the timing reference can be computed as: time=beacon number*superframe duration, for a fixed superframe duration. The timing reference for the beacon 215 can then be computed to be zero (0). If the beacon carries an explicit time stamp, such as in 802.11 networks, the timing reference is simply equal to the time stamp value. The beacon should have the same timing reference at the source and destination regardless of time required for transmission and processing. Since beacon 215 has a timing reference of zero (0), it can be used as a reference for subsequent frames.

Figure 3:
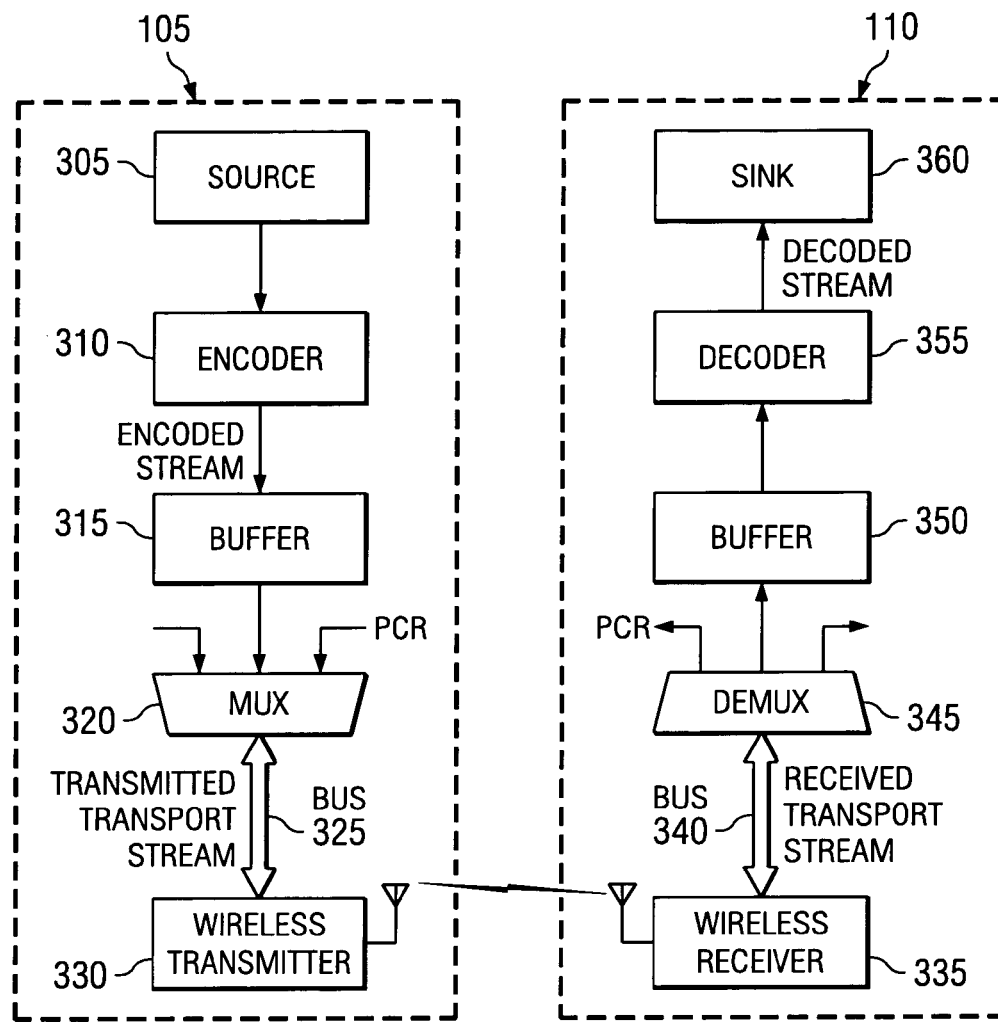
FIG. 3 is a diagram of a detailed view of a pair of wireless devices/stations.

With reference now to FIG. 3, there is shown a diagram illustrating a detailed view of two wireless devices, wherein a first device, the source device 105, can be used to provide content to a second device, the sink device 110. The source device 105 may include a source 305, which can provide a video and/or audio stream. Note that the source 305 may also provide other forms of content, such as computer data. The source 305 may be a DVD player, a digital video camcorder, a stream of audio and video data provided by a subscription to a service that delivers desired content to the subscriber, and so forth. Subscription services may use digital satellite, geosynchronous satellite, low-Earth orbit satellite, TiVo®, ReplayTV®, cable, and so forth to deliver content. The source 305 may provide its content to an encoder 310. The encoder 310 may apply an encoding scheme to the content to help improve error resistance for transmission purposes. The encoder 310 may also compress the content to help reduce overall bandwidth requirements. The encoder 310 can then break the content into elementary packets of a certain specified size. Each packet may contain a time stamp referred to as a decoding time stamp (DTS) as well as a presentation time stamp (PTS). The DTS can be used to indicate a time when the packet should be decoded, while the PTS can indicate a time when the packet should be used or presented. Note that if the DTS and the PTS are the same, then a single time stamp may be used instead of two.

The elementary packets can then be fragmented into constant-length packets, wherein the packet length can be dependent upon the communications system used to transmit the packets. The constant-length packets can be stored in an encoder buffer 315 while they wait to be transmitted. The constant-length packets from different elementary packet streams can be multiplexed together by a multiplexer 320 with program clock reference (PCR) packets and other auxiliary packets to produce a transport stream (TS) that can be transmitted to the sink device 110.

A PCR packet may carry the value of the source clock at the time the packet was created. PCR packets may be multiplexed together with the constant-length packets at a frequency of at least once every 100 ms. The PCR packets can be used to synchronize the system time clocks (STC) of the source device 105 and the sink device 110, so that the STC of the sink device 110 can be used to time the decoding and presentation of the elementary packets received from the source device 105. The use of the PCR packets to synchronize the STC is explained in greater detail below. Note that elementary packets of variable length can directly form program streams (PS) with system clock reference (SCR) packets used in place of PCR packets. The description below discusses transport streams of constant-length packets, but it may also apply to program streams of variable-length packets.

The transport stream (or program stream) can then be sent via a bus 325 to a wireless transmitter 330. The bus 325 may be an IEEE 1394 bus (Firewire) or any other high speed digital interface, such as USB 2.0 (Universal Serial Bus, Version 2.0) or a proprietary bus. The wireless transmitter 330 can then transmit the transport stream to the sink device 110, wherein a wireless receiver 335 can receive the transport stream. If the wireless communications system is a UWB or an IEEE 802.11 compliant system, then the wireless transmitter 330 and the wireless receiver 335 can be designated as a device (DEV) or a station (STA) and may be both a transmitter and a receiver, e.g., a transceiver.

The transport stream, received by the wireless receiver 335, can be sent via a bus 340 (such as an IEEE 1394 bus, USB 2.0, or some other high speed digital interface) to a demultiplexer 345 where the elementary packets, the PCR packets, and other auxiliary packets can be extracted. Upon detection of a PCR packet, STC synchronization circuitry (not shown) can make use of the time stamp contained in the PCR packet to synchronize the STC of the sink device 110 to the STC of the source device 105. The synchronization can thereby correct any drift in the STC of the sink device 110 relative to the STC of the source device 105. The elementary packets can be stored in a decoder buffer 350, where they may be held until they are decoded by decoder 355 and presented to a sink 360 at times specified by the DTS/PTS values.

The DTS/PTS values can be created and used to achieve a constant transport delay from an input of the encoder 310 to decoding by the decoder 355 and presentation. They can function to preserve the relative timings of the content from the source 305 to the sink 360. The PCR packets can be created and used to ensure that the STC for the decoder 355 and the sink 360 is synchronized with the STC for the encoder 310. The synchronized STCs can ensure that the spacing of the content when presented to the sink 360 is the same as those originating from the source 305. When this is achieved, decoder buffer (buffer 350) overflow and/or underrun can be prevented, while video and audio synchronization can be attained.

The synchronization using the PCR and SCR packets can be based upon the premise that all PCR (and SCR) packets undergo a constant delay from the point when they are inserted into the transport stream (or program stream) (at the multiplexer 320) to the point when their time stamps are checked (after the demultiplexer 345). To support this premise, the constituent links from the bus 325 at the source device 105 to the bus 340 at the sink device 110 must each provide a constant packet delay. As discussed previously, from the bus 325 to the bus 340, there may be a wireless link. The bus 325 and the bus 340 can provide a constant packet delay based upon the IEEE 1394 specification or another high speed digital interface specification. The wireless link can provide a constant packet delay via its own time stamps and clock synchronization techniques, as further described below.

Figure 4:
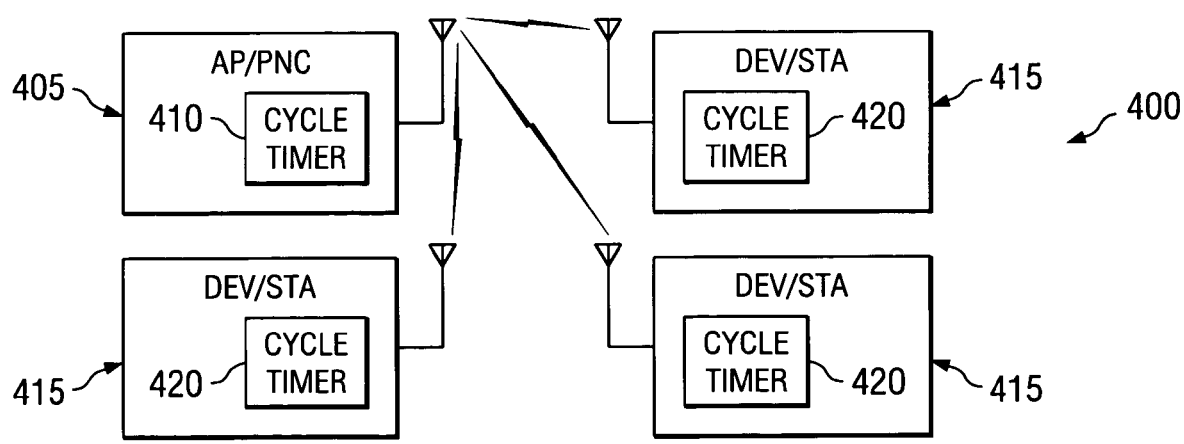
FIG. 4 is a diagram of a wireless communications system with built-in support to synchronize a cycle timer of a device/station to that of a piconet coordinator/access point, according to a preferred embodiment of the present invention.

With reference now to FIG. 4, there is shown a diagram illustrating a wireless communications system 400 with built-in support to synchronize a cycle timer at a device/station to a master cycle timer at an AP/PNC, according to a preferred embodiment of the present invention. As discussed above, a variable transport delay can make it difficult to synchronize clocks between a transmitter and a receiver, since a delay for each packet may not be constant or easily determined. This can prevent the use of simple time stamp synchronization techniques.

A piconet coordinator (PNC) or an access point (AP) 405 (a device that controls access to the communications channel in an IEEE 802.11 wireless communications system, similar to a piconet coordinator in a wireless personal area network) with a master cycle timer 410, can be used to periodically transmit beacons. According to a preferred embodiment of the present invention, the beacons can contain timing information that the receiving devices or stations can use to synchronize with the AP/PNC 405. Such timing information may be included in the beacon number and superframe duration, or an explicit time stamp (not shown). The beacon number can provide a unique identifier for each beacon transmitted by the AP/PNC 405, while the beacon interval, or superframe duration, can give the length of the superframe between the start of the current and the next beacon. The master cycle timer 410 can be employed to time the transmission of beacons by the AP/PNC 405.

A wireless communications system can contain a plurality of devices/stations (DEV/STA) 415, with each device/station 415 containing a cycle timer 420. Note that it may be possible for legacy devices/stations (not shown) to continue to operate in the wireless communications system and that these legacy devices/stations may not contain a cycle timer.

While these legacy devices/stations may operate, they may not be able to support the audio and video timing requirements and would not provide optimal performance if used for audio and video streaming.

When a beacon is received by a device/station 415, the device/station 415 can synchronize its cycle timer 420 to the master cycle timer 410 contained in the AP/PNC 405. According to a preferred embodiment of the present invention, a cycle timer may be a counter, N-bits in length, whose higher-order bits can be used to represent a beacon number, i.e., a beacon counter, and whose lower-order bits can be used to represent a superframe offset. The higher-order bits (the beacon number) may indicate the time at which a beacon containing that beacon number is transmitted into the wireless medium. The lower-order bits (the superframe offset) may indicate a specific time in the middle of a superframe. At the AP/PNC 405, the superframe offset can initially be zero at the start of each superframe and increments continuously during the superframe, and being reset to zero at the star of the next superframe.

As the superframe offset increments to a value that is equal to nominal current superframe duration, it wraps around to zero (0) and the beacon number is incremented, preferably, by one. At essentially the same time as the superframe offset is wrapped around to zero (reset), the AP/PNC 405 may transmit a beacon into the wireless medium. When a device/station 415 receives a beacon, it can determine the drift of its cycle timer with respect to the master cycle timer 410, which may be used to time the beacon transmission. The drift in the device/station's cycle timer may be a difference, modulo the current superframe duration, between the readings of the local cycle timer and the master cycle timer 410 at the time when the difference is calculated.

The local cycle timer can be read from the beacon number and superframe offset bits contained at the device/station 415 as described above. The reading of the master cycle timer 410 can be determined as follows: the value of the beacon number bits is the superframe number carried in the received beacon and the value of the superframe offset bits is the update delay, which was described previously. If the beacon contains a timestamp, then the reading of the master cycle timer 410 may simply be the value of the timestamp plus the update delay. The local cycle timer at the device/station 415 is then adjusted with this calculated difference to match with the master cycle timer. The adjustment to the local cycle timer is preferably performed through a number of corrections over the current superframe, with each correction adjusting the cycle timer by a small amount, so that the local cycle timer does not show appreciable discontinuities. The presence of discontinuities in the cycle timer may lead to packet delay jitters, and therefore, should be avoided.

Figure 5:
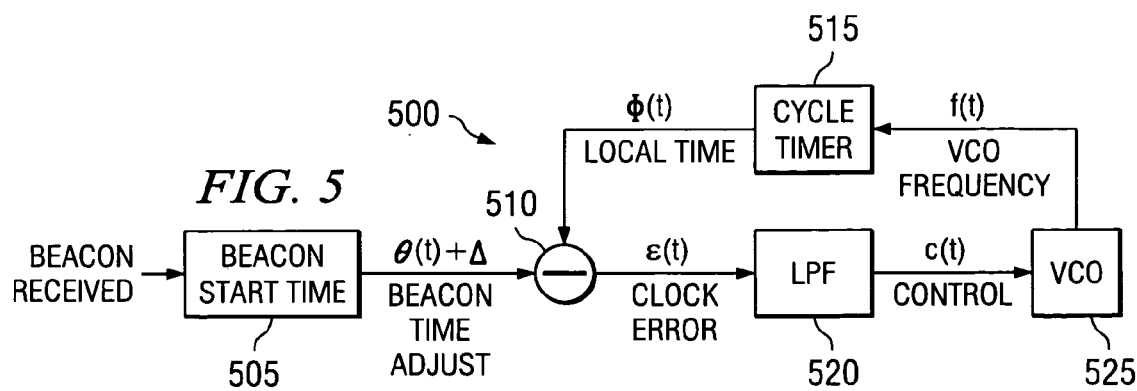
FIG. 5 is a diagram of a phase-locked loop (PLL) structure that can be used to make adjustments to a cycle timer of a device/station, according to a preferred embodiment of the present invention.

With reference now to FIG. 5, there is shown a figure illustrating a phase-locked loop (PLL) structure 500 that can be used to have a cycle timer of a device/station smoothly track a master cycle timer of a PNC or AP, according to a preferred embodiment of the present invention. According to a preferred embodiment of the present invention, the PLL structure 500 can be used to force a cycle timer, such as the cycle timer 420 (FIG. 4), to track smoothly a master cycle timer, such as the master cycle timer 410 (FIG. 4), based upon a beacon received by a device/station, such as the device/station 415 (FIG. 4). As discussed previously, a beacon can be transmitted by a PNC, an AP, or some other device whose function may be to control or facilitate access to the communications channel.

When the device/station 415 receives a beacon, it can extract the beacon's start time information and store it in a beacon start time element 505. The device/station 415 can determine the beacon's start time based upon the beacon number and superframe duration, or the time stamp, contained in the beacon, as described in the above. For example, if the AP/PNC 405 transmits a beacon every 10 ms, then the device/station 415 can calculate the beacon's start time to be M*10 ms, wherein M is the beacon number of the beacon and the superframe duration is 10 ms.

The device/station 415 can then compute a beacon time adjust, wherein the beacon time adjust may be equal to the beacon start time plus an update delay. The update delay can be predetermined as described above. The adjusted beacon time can then be subtracted from the value of the cycle timer 515 via a subtractor 510 to produce a clock error value, $\epsilon(t)$. The clock error value, $\epsilon(t)$, can then be filtered by a low pass filter (LPF) 520 to produce a time control signal, c(t). The LPF 520 can be used to smooth out the correction of the cycle timer 515. The time control signal may then be provided to a voltage controlled oscillator (VCO) 525 which may produce an output signal with a frequency essentially equal to a free running frequency plus a delta frequency that is proportional to the time control signal, c(t). The output of the VCO 525 can then be provided to drive the cycle timer 515. Note that with a zero input for the VCO 525, the cycle timer 515 would be a free running clock driven by the free running frequency of the VCO 525.

According to a preferred embodiment of the present invention, the output of the VCO 525 can be used to drive the cycle timer 515 and hence update the value of the cycle timer 515, such that the cycle timer 515 tracks the master cycle timer used to time the beacon transmission. For example, if the cycle timer 515 runs faster relative to the master cycle timer, its value will be larger than the beacon time adjust, and hence the clock error $\epsilon(t)$ and control signal c(t) will have negative values. The output of the VCO 525 will then decrease the frequency of the cycle timer 515, and therefore the cycle timer will slow down to match up with the master cycle timer. On the other hand, if the cycle timer 515 runs slower relative to the master cycle timer, its value will be smaller than the beacon time adjust, and hence the clock error $\epsilon(t)$ and control signal c(t) will have positive values. The output of the VCO 525 will then increase the frequency of the cycle timer 515, and therefore the cycle timer will run faster to match up with the master cycle timer. Note that with the LPF 520, the input and output of the VCO 525 change gradually, so does the value of the cycle timer 515. Thus, discontinuities may not appear in the value of the cycle timer 515, which would otherwise occur if the value of the cycle timer 515 were to be changed instantaneously upon receipt of a beacon.

With the cycle timer 420 of each device/station 415 synchronized to the master cycle timer 410 of the AP/PNC 405, the cycle timers of the devices/stations become synchronized to one another. This achieves clock synchronization between the wireless transmitter 330 and the wireless receiver 335.

Figure 6:
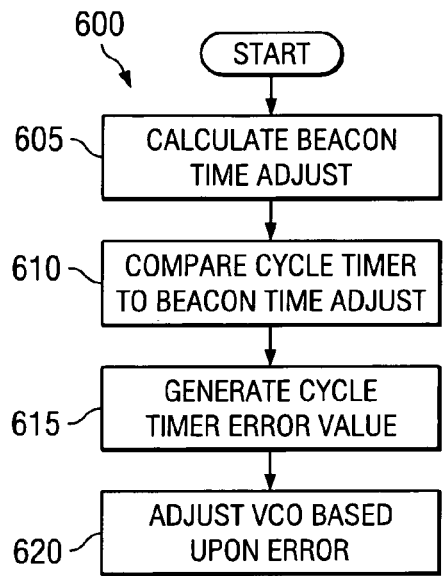
FIG. 6 is a flow diagram of an algorithm that can be used to synchronize a local timer based upon a periodically transmitted beacon, according to a preferred embodiment of the present invention.

With reference now to FIG. 6, there is shown a flow diagram illustrating an algorithm 600 that can be used to synchronize a local timer based upon a periodically transmitted beacon, according to a preferred embodiment of the present invention. According to a preferred embodiment of the present invention, the algorithm 600 may execute on a controller, general purpose processing element, special purpose processing element, custom designed integrated circuit, software, or so forth, that can be used to control the operations of a receiver in a wireless communications system. The algorithm 600 may be executed each time that the receiver receives a beacon, wherein the controller may initialize the execution of the algorithm 600 in response to a successful reception of a beacon. Alternatively, the algorithm 600 may be in a wait state, waiting for the arrival of a beacon and then beginning execution once a beacon arrives.

After the receiver receives and processes a beacon, the controller can calculate a beacon adjust time (block 605). The calculation of the beacon time adjust value was discussed previously in the discussion of FIG. 5. After calculating the beacon time adjust value, the controller can compare the beacon time adjust value with a current value in the cycle timer (block 610), which, according to a preferred embodiment of the present invention, may be performed via a subtraction operation. From the difference between the beacon time adjust value and the cycle timer value, a timer error value (if any) can be generated (block 615). The timer error value can then be used to adjust an output frequency of a VCO, which can be used to drive the cycle timer (block 620). According to a preferred embodiment of the present invention, if the value in the cycle timer is less than the beacon time adjust, then the cycle timer is slow and the output frequency of the VCO should be increased, while if the value of the cycle timer is greater than the beacon time adjust, then the cycle timer is fast and the output frequency of the VCO should be decreased.

Figure 7A:
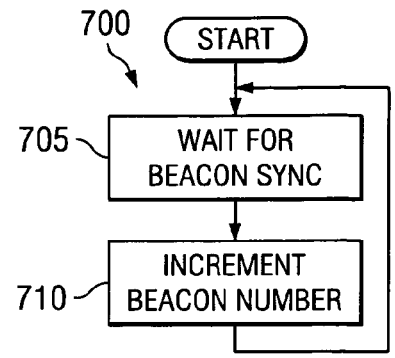
FIGS. 7a and 7b are flow diagrams of algorithms for maintaining a beacon frame counter and a superframe offset for an access point or piconet coordinator, according to a preferred embodiment of the present invention.
Figure 7B:
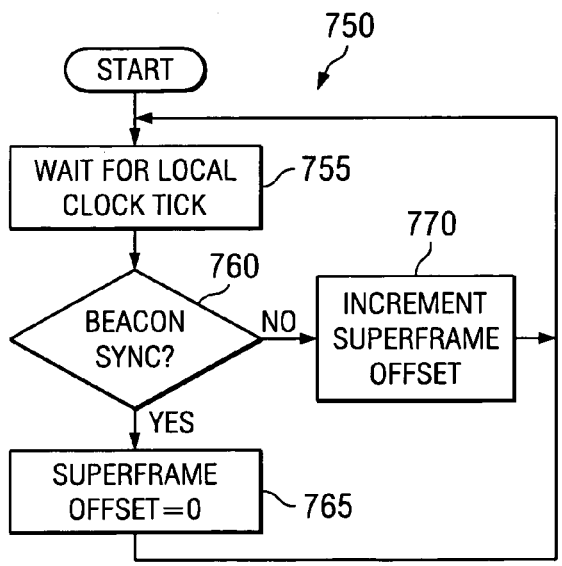

With reference now to FIGS. 7a and 7b, there are shown flow diagrams illustrating algorithms for maintaining a beacon counter (algorithm 700) and a superframe offset (algorithm 750) at an access point or piconet coordinator, according to a preferred embodiment of the present invention. The algorithms 700 and 750 may be used by an access point, piconet coordinator, or some other network control device (simply referred to as an access point, such as the AP/PNC 405 (FIG. 4)) to embed necessary information in beacons that can permit the use of the beacons to synchronize a cycle timer in a device/station 415 with a master cycle timer 410 (FIG. 4) located in the AP/PNC 405. According to a preferred embodiment of the present invention, the AP/PNC 405 can maintain three pieces of information that can be used by a device/station 415 to help it synchronize its local cycle timer with the master cycle timer 410 located in the AP/PNC 405.

A first piece of information can be a beacon number, which can be used to uniquely identify a beacon out of a series of beacons. The beacon number, in conjunction with a second piece of information as described below, can be used to calculate a time when the beacon was transmitted into the wireless medium. Preferably, the beacon number can start off at zero and then increase in a monotonic fashion.

A second piece of information that can be maintained at the AP/PNC 405 is a value that indicates the duration of a superframe. This can also be used to indicate the period of the beacons, since in many wireless communications systems, a beacon can be transmitted in between superframes. In fact, a beacon can be used to indicate the beginning of a superframe. According to a preferred embodiment of the present invention, the two pieces of information (beacon number and superframe duration) can be placed in each beacon.

A third piece of information that can be maintained at the AP/PNC 405, but not contained in the beacon, is a superframe offset. The superframe offset can be a value in a counter that may be driven by a high frequency clock. The purpose of the superframe offset can be to indicate an amount of time between a beacon sync event and the current time. According to a preferred embodiment of the present invention, the superframe offset can be reset after a beacon sync event. As stated previously, the beacon counter and the superframe offset can be stored collectively in a cycle timer.

The algorithm 700 can be executed on a controller (or general purpose processing element, special purpose processing element, custom designed integrated circuit, software, etc.) responsible for the operation of the AP/PNC 405. Whenever the controller detects a beacon sync event (block 705), it can increment the beacon counter (block 710). Note that the beacon counter should be of sufficient size so that the counter does not wrap around frequently. For example, if the beacon counter is a 16-bit counter and beacon syncs occur once every 10 ms, then the beacon counter would wrap around once every 655.36 seconds or 10.922 minutes.

The algorithm 750 may also be executed on the controller (or general purpose processing element, special purpose processing element, custom designed integrated circuit, software, etc.). At a clock tick of a high frequency clock (block 755) with a sufficiently high frequency, for example, approximately 60 MHz, to provide adequate timing resolution to control packet transport delay over the wireless network, the controller can check to see if a beacon sync event has also occurred (block 760). If a clock tick and a beacon sync occur at essentially the same time, then the current superframe is complete and a new superframe will begin, so the superframe offset should be reset to zero (0) (block 765). The beacon counter should also be incremented (as performed by the algorithm 700). If the beacon sync event does not also occur at essentially the same time as the clock tick, then the controller simply increments the superframe offset (block 770). By definition, a beacon sync event occurs when the value of the superframe offset reaches the value of the superframe duration.

Figure 8A:
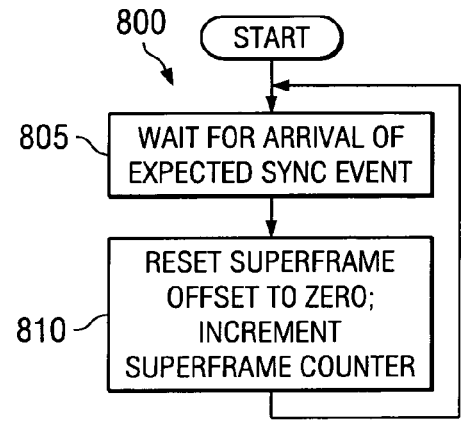
FIGS. 8a and 8b are flow diagrams of algorithms for maintaining a beacon frame counter and a superframe offset for a recipient device/station, according to a preferred embodiment of the present invention.
Figure 8B:
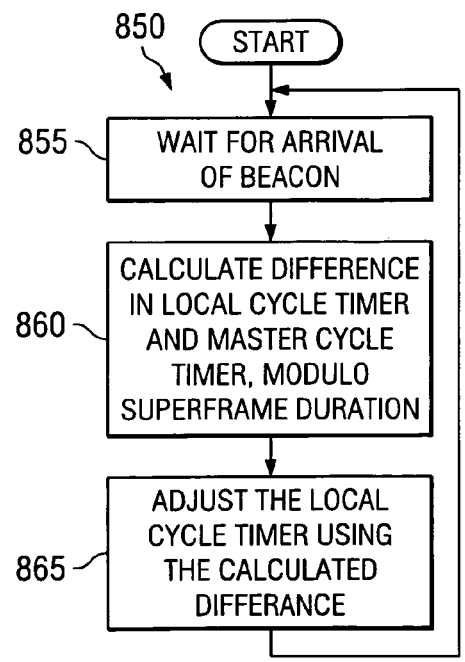

With reference now to FIGS. 8*a* and 8*b*, there are shown flow diagrams illustrating algorithms for maintaining a superframe offset (algorithm 800 (FIG. 8*a*)) and a local cycle timer (algorithm 850 (FIG. 8*b*)) at a device/station 415, according to a preferred embodiment of the present invention. According to a preferred embodiment of the present invention, the three pieces of information mentioned in the above can be maintained locally by the device/station 415 and can be updated via beacons received from the AP/PNC 405.

According to a preferred embodiment of the present invention, each device/station 415 that is enhanced with the capability of synchronizing with the AP/PNC 405 maintains a cycle timer, such as the cycle timer 420 (FIG. 4). Note that the cycle timer for a device/station 415 may be referred to as a local cycle timer. As discussed previously, the cycle timer 420 can maintain a beacon counter and a superframe offset. Furthermore, the device/station 415 may also locally store the superframe duration. A beacon received by the device/station 415 may also carry a superframe number and superframe duration. However, according to a preferred embodiment of the present invention, only the superframe duration information can be used to directly update the cycle timer in the device/station 415. The beacon number can be used to provide a sanity check against the beacon counter derived from the superframe duration.

The algorithm 800 can be executed on a controller (or general purpose processing element, special purpose processing element, custom designed integrated circuit, software, etc.) responsible for the operation of the device/station 415. The algorithm 800 can be used to control the updating of the superframe counter (also referred to as a beacon counter) and superframe offset at the device/station 415. The controller may wait for the arrival of an expected sync event (block 805). An expected sync event occurs when the superframe offset reaches a value equal to the current superframe duration. When an expected sync event occurs at the device/station 415 (block 805), the controller can reset the superframe offset to zero and increment the superframe counter by one (block 810). The superframe offset may then continue to increment at each clock tick just as it did prior to the expected sync event and the reset (block 810). After resetting the superframe offset to zero and incrementing the superframe counter by one (block 810), the controller can return to block 805 to wait for the arrival of the next expected sync event. Note that the controller may return to normal operation rather than wait for the arrival of the next expected sync event and when the next expected sync event occurs, an interrupt may be asserted and then the controller may respond to the interrupt.

The algorithm 850 can also be executed on a controller (or general purpose processing element, special purpose processing element, custom designed integrated circuit, software, etc.) responsible for the operation of the device/station 415. The algorithm 850 can be used to adjust the local cycle timer at the device/station 415. The controller may wait for the arrival of a beacon (block 855). Due to clock drift as described in the above, a beacon may not arrive when expected. For example, if the device/station 415 has a fast clock, then the expected beacon sync event could occur prior to the actual beacon sync event. When a beacon is received at the device/station 415 (block 855), the controller can calculate the difference, modulo the current superframe duration, between the value of the local cycle timer and the master cycle timer (block 860). The value of the local cycle timer is given by the higher order beacon number bits and the lower order superframe offset bits. The value of the master cycle timer is given by the higher order beacon number bits whose value equals the superframe number contained in the received beacon and the lower order superframe offset bits whose value equals the update delay. The update delay is described earlier. The controller can then adjust the local cycle timer by using the calculated difference (block 865). The adjustment should be done as gradually as possible. This may be accomplished through the use of a PLL as described above.

Figure 9:
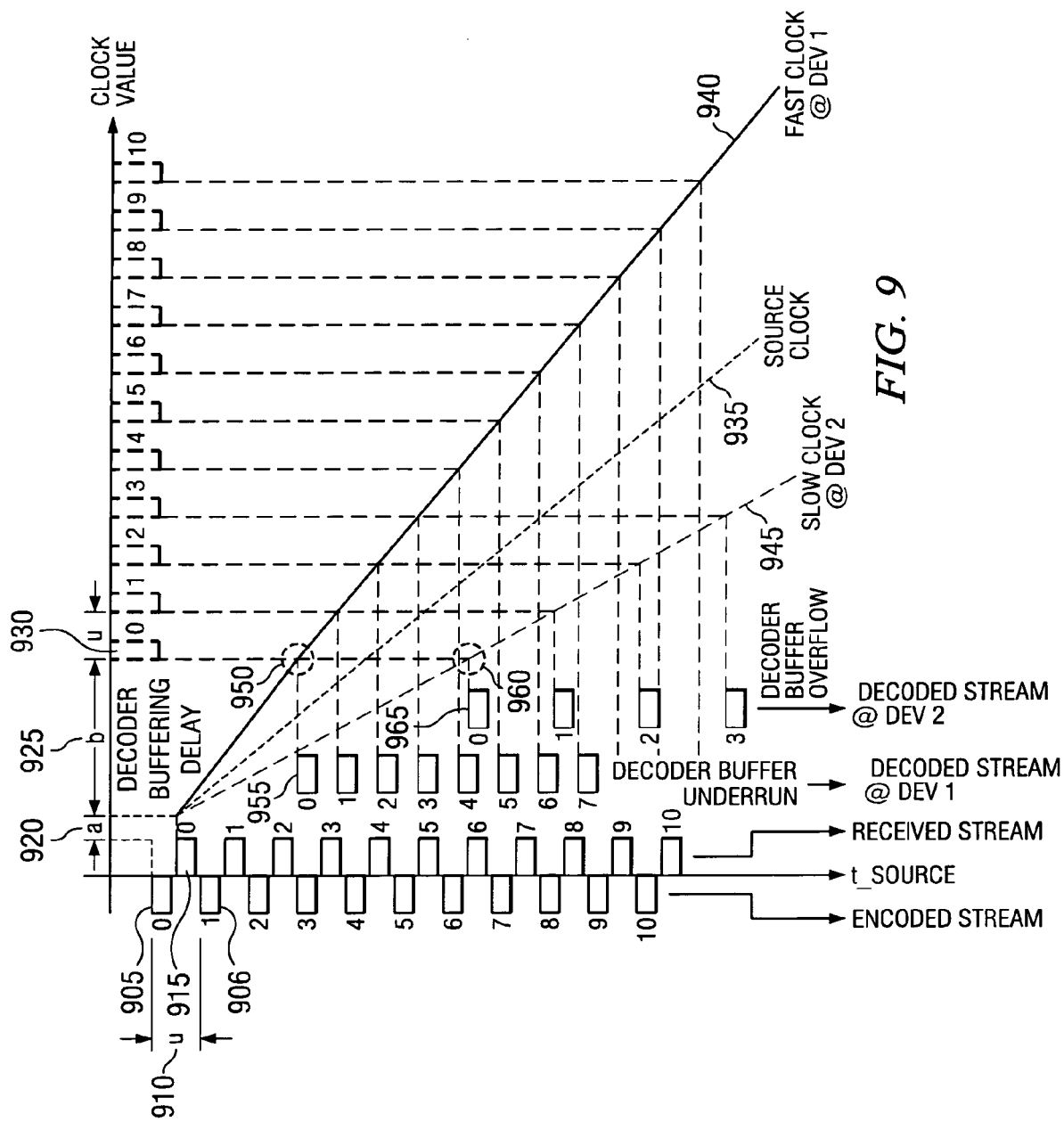
FIG. 9 is a time-space diagram showing the effects of unsynchronized clocks on packet decoding and presentation at an MPEG-2 application sink.

With reference now to FIG. 9, there is shown a time-space diagram illustrating possible effects of unsynchronized clocks at source and sink devices/stations in a communications system. FIG. 9 illustrates the possible effects on a data stream received by a sink device/station, such as the device/station 415 (FIG. 4), which may have an inaccurate clock. There are two cases shown in FIG. 9, a first case wherein the unsynchronized clock is fast and a second case wherein the unsynchronized clock is slow, as compared to a clock at a source device/station, such as the device/station 415 in FIG. 4. A first set of blocks (oriented vertically), such as blocks 905 and 906, can represent a stream of constant-length packets at the source. The stream of constant-length packets may be those packets produced by an encoder, such as the encoder 310 (FIG. 3). Each of the constant-length packets may be separated from one another by an interval, u, 910. According to a preferred embodiment of the present invention, the intervals between two successive constant-length packets are essentially equal.

A second set of blocks (also oriented vertically), such as block 915, can represent the stream of constant-length packets after they are received by the device/station 415. Note that there may be a path delay between the arrival of the stream of constant-length packets at the source device/station 415 and their receipt at the sink device/station 415; this path delay is denoted as a second interval, a, 920. A third interval, b, 925 can represent a delay encountered in a buffer, such as the buffer 350 (FIG. 3), while waiting to be decoded and presented. Note that the third interval, b, 925 may not be in scale to simplify the figure. A third set of blocks (oriented horizontally), such as block 930, can represent the output of the buffer 350. These blocks may be ready for decoding in a decoder, such as the decoder 355 (FIG. 3).

Three diagonal lines can represent the clocks of the devices in the communications system. A first diagonal line 935 represents a clock of the source device/station, while a second diagonal line 940 represents a clock of a sink device/station 415 with a fast clock, and a third diagonal line 945 represents a clock of a device/station 415 with a slow clock. The block 930 represents data that has been decoded and is ready for presentation (for example, to be displayed if the block 930 contains video information). A time representing when an initial portion of the block 930 is ready for use at the sink device/station 415 with a fast clock may be found at an intersection with the second diagonal line 940 at point 950, with subsequent blocks in the third set of blocks following as soon as they have been decoded. This produces a fourth set of blocks (oriented vertically), such as block 955, that are ready for decoding and presentation at a device/station 415 with a fast clock at times referenced to the source clock. Note that the blocks in the fourth set of blocks appear to be closer together than when initially generated (the first set of blocks). Since the blocks are closer together, they can be consumed at a greater rate than they are being produced, thereby leading to a buffer underrun situation, which can cause undesirable jitters.

Meanwhile, a time representing when an initial portion of the block 930 is ready for use at the sink device/station 415 with a slow clock may be found at the intersection with the third diagonal line 945 at point 960, with subsequent blocks in the third set of blocks following as soon as they have been decoded. This produces a fifth set of blocks (oriented vertically), such as block 965, that are ready for decoding and presentation at a device/station 415 with a slow clock at times referenced to the source clock. Note that in this case, the blocks in the fifth set of blocks appear to be further apart then when initially generated (the first set of blocks). Since the blocks are further apart, they can be consumed at a slower rate than they are being produced, thereby leading to a buffer overflow situation, which may cause undesirable packet losses.

Figure 10:
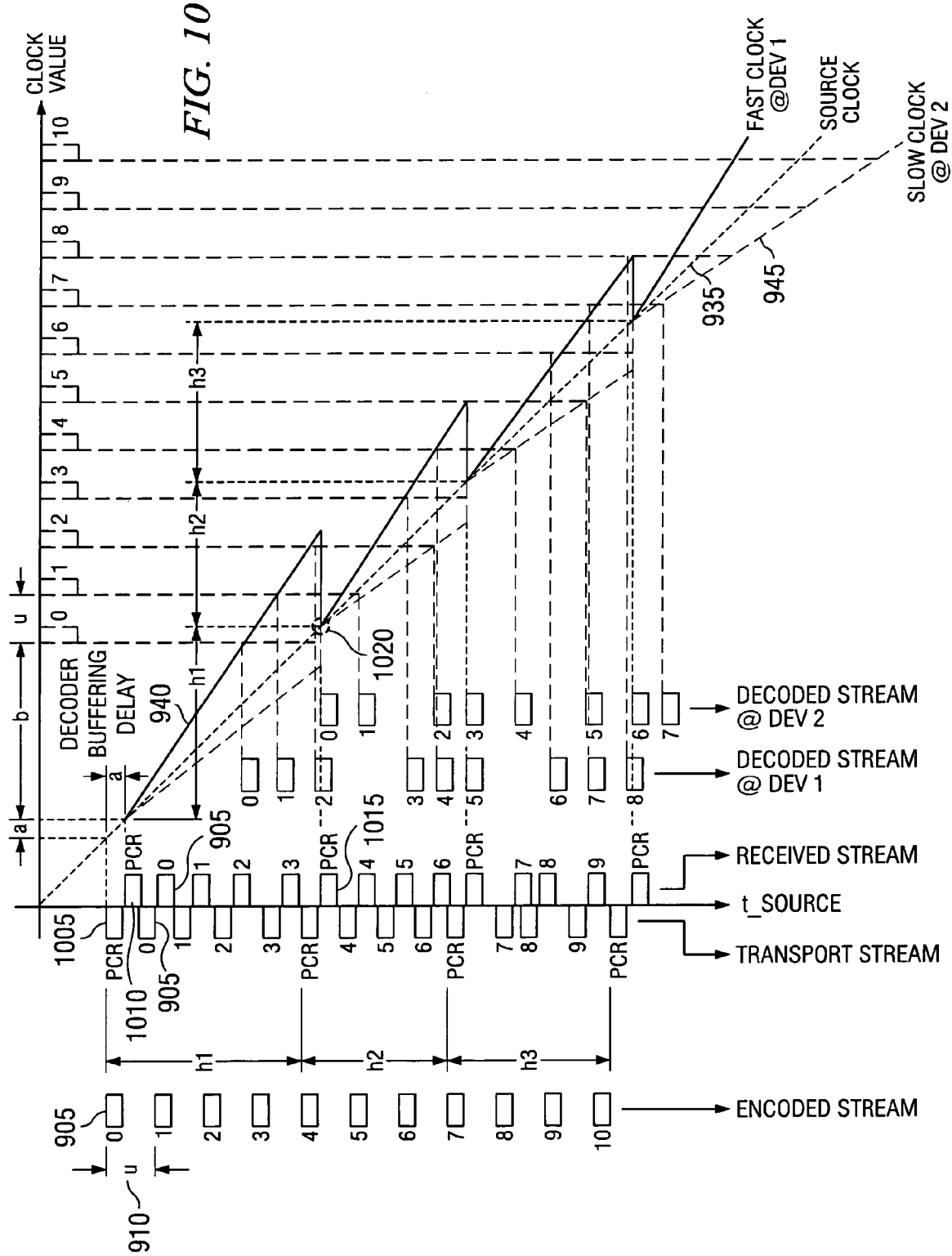
FIG. 10 is a time-space diagram showing the synchronization of inaccurate clocks and their effects at an MPEG-2 application sink.

With reference now to FIG. 10, there is shown a time-space diagram illustrating a use of PCR packets to help synchronize a clock in a sink device/station with a clock in a source device/station. As in FIG. 9, the first set of blocks, such as block 905 and 910, represents the stream of constant-length packets at the source device/station 415. A second set of blocks, such as blocks 1005, represents the stream of constant-length packets after PCR packets have been multiplexed into the stream at the source device/station 415, wherein block 1005 may be a PCR packet. A third set of blocks, such as block 1010, represents the stream of constant-length packets with the PCR packets after they are received by a sink device/station 415. Once again, the diagonal lines 935, 940, and 945 represent clocks at the source device, at a sink device/station with a fast clock, and at a sink device/station with a slow clock, respectively.

Whenever a PCR packet, such as block 1010, is received at the sink device/station 415, the clock of the sink device/station 415 can be synchronized with the clock of the source device/station 415. For example, when the PCR packet (block 1015) is received at the sink device/station 415 (point 1020), the two diagonal lines representing the fast clock 940 at one sink device/station 415 and the slow clock 945 at another device/station 415 are changed so that they converge to the diagonal line representing the clock at the source device/station 415. Note however, that as time continues to pass, the clocks of the two sink device/stations may once again diverge from the clock of the source device/station before they converge to the latter again upon receipt of the next PCR packet.

The above clock synchronization method quasi-periodically forces the values of the sink clocks to be equal to the value of the source clock. The sink clocks thus do not ever diverge far from the source clock. However, when the sink clocks are forced to be equal to the source clock, they may experience discontinuities. As such, the stream of packets released for decoding and presentation mirrors the stream of packets generated at the source over time, thus avoiding buffer overflow or underrun. Packet jitters, however, still exist, but they may be reduced by using a PLL in a way similar to the one described in connection with FIG. 5, where a PLL is employed to gradually and hence smoothly adjust the sink clock to the source clock.

Maintaining constant end-to-end delays for the PCR packets is essential to the synchronization between the system clocks of the source and sink devices/stations as described in the above and used in such applications as MPEG-2. To achieve such end-to-end constant delays, each of the links comprising the end-to-end path must also provide a constant link delay for the packets traversing it. Constant link packet delay may be achieved by introducing timestamps at the link level, just as end-to-end constant packet delay is accomplished by using timestamps (DTS and PTS) at the application level. The link-level timestamp scheme in turn requires the synchronization of the clocks at the sender and recipient of the link.

For the example shown in FIG. 3, there are two IEEE 1394 bus links and one wireless link from the source to the sink. The IEEE 1394 standard uses cycle start packets—which are similar to beacon frames—to synchronize the sender and recipient clocks on a 1394 bus and hence allows the timestamps pertaining to the 1394 bus to guarantee a constant delay transport of all the PCR packets across each 1394 bus. On the other hand, clock synchronization between the sender and recipient on the wireless link is accomplished by means of beacon reception as described in the above. Timestamps introduced for the wireless link then control the PCR packet delays across the wireless link to be identical within certain accuracy.

For MPEG-2 applications, an MPEG-2 transport stream packet is appended with a timestamp as the packet enters the wireless link. The value of the timestamp is the value of the system clock for the source device/station 415 at the time the packet enters the wireless link, plus an anticipated link delay. The link delay is determined such that it allows for sufficient number of retries as needed by the wireless link and required by the supported application, while accounting for the transmit and receive buffer sizes. When an MPEG-2 packet is received by the sink device/station 415, the packet is temporarily buffered until the value of the local system clock reaches the value of the timestamp appended to that packet, at which time the packet is released to the application level and may be stored in the decoder buffer 350 for decoding and presentation based on the application timestamps (DTS and PTS). A number of MPEG-2 packets may be assembled into a data unit at the source device/station 415 for transport across the wireless link, and deassembled from the received data unit at the sink device/station 415 at the other side of the wireless link. The system clocks, i.e., the cycle timers, of the source and sink devices/stations 415 are both synchronized to the master cycle timer of the PNC/AP 405 via beacon reception as described in the above, and hence to each other.

Figure 11:
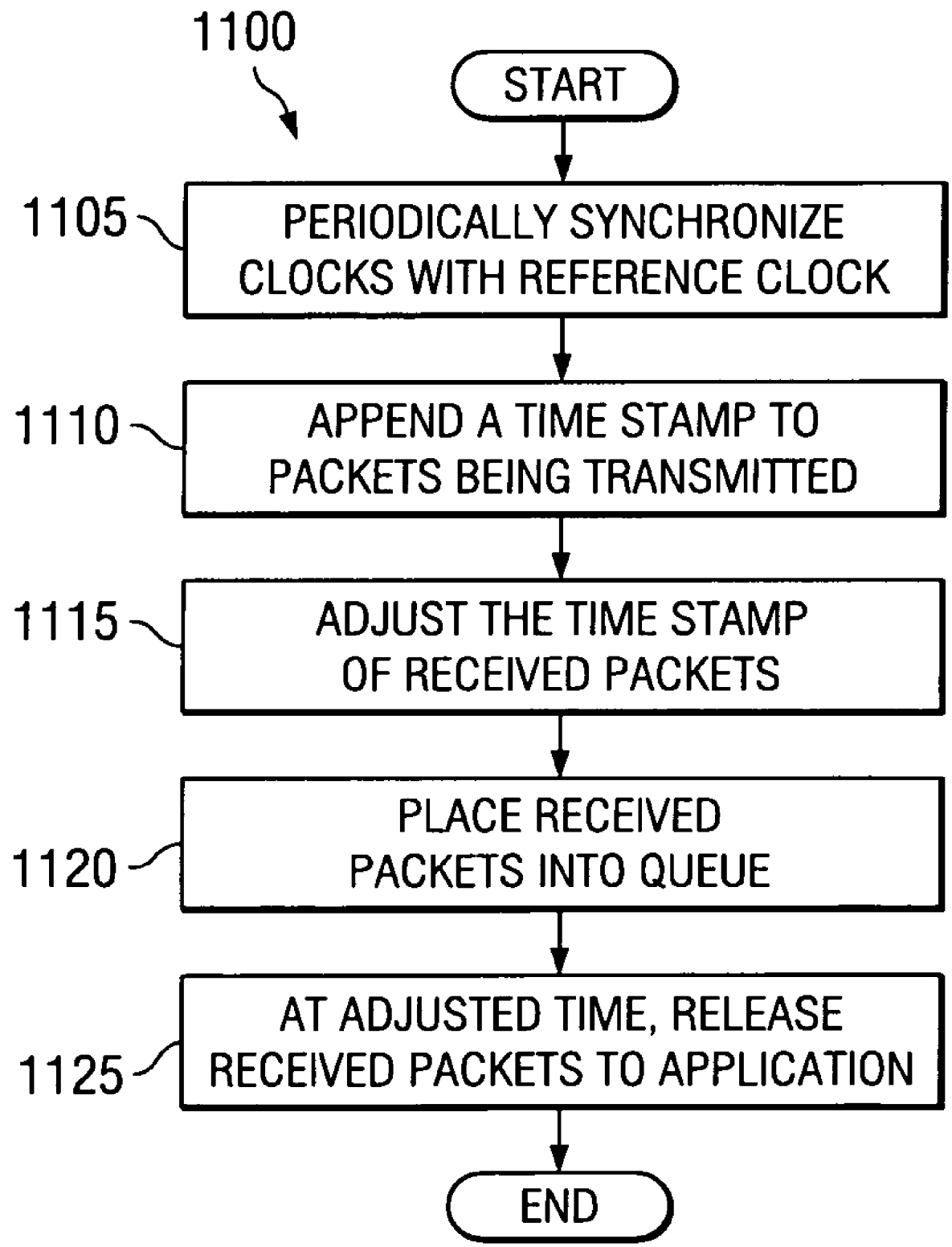
FIG. 11 is a flow diagram of a process for maintaining timing relationships between packets from a transmitter to a receiver of a wireless communications network.

With reference now to FIG. 11, there is shown a flow diagram illustrating a process 1100 for maintaining timing relationships between packets from a transmitter to a receiver of a wireless communications network, according to a preferred embodiment of the present invention. The process 1100 may take place across several devices operating within a wireless communications network. The devices may include an AP/PNC (such as the AP/PNC 405 in FIG. 4), a source device (such as the source device 105 in FIG. 3), and a sink device (such as the sink device 110 in FIG. 3). The maintenance of timing relationship between packets, both at the transmitter (the source device 105) and the receiver (the sink device 110), can begin with ensuring that clocks on the source device 105 and the sink device 110 are in synchrony with each other (block 1105). This can be accomplished by ensuring that the local clocks are synchronized with a reference clock, such as a master cycle clock 410 located in the AP/PNC 405.

Prior to transmission, a timestamp may be placed into each packet at the transmitter (block 1110). The timestamps may be the value of the clock of the transmitter as the packet enters a link layer from a higher layer at the transmitter of the wireless network, plus an anticipated link delay. The anticipated link delay includes such delays as incurred by transmission, reception processing, buffering, and retransmissions in cases of transmission failures. Alternatively, the transmitter may not include an anticipated link delay in the value of the timestamp. If the link delay is not included in the value inserted into the timestamp, the receiver can perform an adjustment to the timestamp by adding the anticipated link delay value to it (block 1115). The received packets can be placed in a receive buffer (block 1120), either before or after the timestamp is adjusted, to wait for when the local time at the receiver is essentially equal to the value of the time stamp. When the local clock of the receiver is essentially equal to the value of the time stamp in a given received packet, that received packet may be released to an application for which it is intended (block 1125). For example, if the received packets contain audio and video information, then the received packets can be provided to an application that converts the data in the received packets into sound and pictures.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for preserving packet timing relationships at a source and a destination, the method comprising:
   synchronizing local clocks at the source and the destination to a reference clock at periodic intervals;
   appending a timestamp to each packet of a plurality of packets at the source;
   transmitting each packet to the destination;
   adjusting the timestamp of each packet at the destination; and
   releasing each packet to an application level when a local clock of the destination is essentially equal to the adjusted timestamp of the packet.

2. The method of claim 1, wherein the packets being appended with the timestamp are data packets.

3. The method of claim 1, wherein the synchronizing comprises:
   receiving a message, wherein the message is one of a periodic sequence of messages;
   calculating a start time for the message;
   adjusting the start time for the message;
   computing a clock error value; and
   correcting a local clock value with the clock error value.

4. The method of claim 1, wherein the timestamp specifies a time of the local clock at the source when a packet enters a link level of the source.

5. The method of claim 4, wherein the timestamp further includes an anticipated link delay.

6. The method of claim 5, wherein the link delay includes delays incurred by transmission, reception, processing, buffering, and retransmissions in case of transmission failures.

7. The method of claim 1, wherein the packets are MPEG-2 transport stream packets, and the timestamp specifies a time to release the MPEG-2 transport stream packets to an MPEG-2 application player for MPEG-2 packet decoding and presentation.

8. The method of claim 1, wherein the adjusting comprises adding a link delay to the timestamp.

9. The method of claim 8, wherein the link delay includes delays incurred by transmission, reception, processing, buffering, and retransmissions in case of transmission failures.

10. The method of claim 1 further comprising prior to the releasing, buffering the data.

11. The method of claim 10, wherein the buffering occurs at a receive buffer of the destination.

12. The method of claim 1, wherein the source and the destination are wireless connected.

13. The method of claim 1, wherein the source contains a transmitter and the destination contains a receiver.

14. A method for correcting a clock in a wireless network, the method comprising:
   receiving a frame, wherein the frame is one of a periodic sequence of frames;
   calculating a start time for the frame;
   adjusting the start time for the frame;
   computing a clock time error value; and
   correcting a local clock time value of the clock with the clock time error value.

15. The method of claim 14, wherein the frames are uniquely numbered and a start time for the frame can be determined from the frame's unique number.

16. The method of claim 15, wherein the start time is equal to the unique number times the period of the periodic sequence.

17. The method of claim 16, where the period of the periodic sequence of frames is contained in each frame.

18. The method of claim 14, where each frame contains a value corresponding to its start time.

19. The method of claim 14, wherein the adjusting comprises adding an update delay to the start time of the frame.

20. The method of claim 19, wherein the update delay corresponds to a transmission and processing delay for each of the periodic frames in the wireless network.

21. The method of claim 20, wherein the update delay is consistent for all frames.

22. The method of claim 14, wherein the computing comprises subtracting a local clock time value from the adjusted start time for the frame.

23. The method of claim 14, wherein an oscillator is used to generate a signal to control the local clock, and wherein the correcting comprises changing a frequency of the signal with the clock time error value.

24. The method of claim 23, wherein the change to the frequency of the signal is performed instantaneously.

25. The method of claim 23, wherein the change to the frequency of the signal is performed gradually.

26. The method of claim 23, wherein a voltage controlled oscillator is used as the oscillator.

27. The method of claim 23 further comprising filtering the clock time error value prior to using it as an input to the oscillator.

28. The method of claim 27, wherein the filter performs a low pass filtering.

29. A circuit comprising:
   an adder, the adder configured to combine an update delay with a beacon start time;
   a subtractor coupled to the adder, the subtractor configured to subtract a local time from an output of the adder to produce a clock time error value;
   a voltage controlled oscillator coupled to the subtractor, the voltage controlled oscillator configured to generate a signal at a frequency dependent upon the clock time error value; and
   a local timer coupled to the voltage controlled oscillator, the local timer configured to track elapsed time based on the frequency of the signal.

30. The circuit of claim 29, wherein the local time is provided by the local timer.

31. The circuit of claim 30, wherein the local timer maintains a frame counter and a frame offset.

32. The circuit of claim 31, wherein the frame counter is equal to a beacon number contained in a beacon.

33. The circuit of claim 31, wherein the beacon start time is equal to a beacon number times a beacon interval.

34. The circuit of claim 33, wherein the beacon start time is equal to a timestamp included in the beacon.

35. The circuit of claim 29 further comprising a filter having an input coupled to the subtractor and an output coupled to the voltage controlled oscillator, the filter to smoothen the output of the subtractor.

36. The circuit of claim 35, wherein the filter is a low pass filter.

37. The circuit of claim 29, wherein the circuit is used in a wireless receiver.

38. The circuit of claim 37, wherein the wireless receiver is used in an IEEE 802.11 compliant communications system.

39. The circuit of claim 37, wherein the wireless receiver is used in a wireless personal area network.

* * * * *

UNITED STATES PATENT AND TRADEMARK OFFICE
CERTIFICATE OF CORRECTION

PATENT NO. : 7,668,243 B2  Page 1 of 1
APPLICATION NO. : 10/847804
DATED : February 23, 2010
INVENTOR(S) : Ho et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1653 days.

Signed and Sealed this

Twenty-eighth Day of December, 2010

David J. Kappos
*Director of the United States Patent and Trademark Office*